United States Patent
Miki et al.

(10) Patent No.: US 10,974,204 B2
(45) Date of Patent: Apr. 13, 2021

(54) POROUS MEMBRANE AND PROCESS FOR PRODUCING POROUS MEMBRANE

(71) Applicant: ASAHI KASEI KABUSHIKI KAISHA, Tokyo (JP)

(72) Inventors: Yuki Miki, Tokyo (JP); Daisuke Okamura, Tokyo (JP); Hirokazu Fujimura, Tokyo (JP); Masatoshi Hashino, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 16/309,362

(22) PCT Filed: Jun. 14, 2017

(86) PCT No.: PCT/JP2017/021919
§ 371 (c)(1),
(2) Date: Dec. 12, 2018

(87) PCT Pub. No.: WO2017/217446
PCT Pub. Date: Dec. 21, 2017

(65) Prior Publication Data
US 2019/0247801 A1    Aug. 15, 2019

(30) Foreign Application Priority Data
Jun. 17, 2016   (JP) .............................. JP2016-120663

(51) Int. Cl.
*B01D 69/02* (2006.01)
*B01D 71/34* (2006.01)
(Continued)

(52) U.S. Cl.
CPC ......... *B01D 69/02* (2013.01); *B01D 67/0016* (2013.01); *B01D 69/081* (2013.01);
(Continued)

(58) Field of Classification Search
CPC ........ B01D 69/02; B01D 69/08; B01D 71/68; B01D 2323/02; B01D 2325/34;
(Continued)

(56) References Cited

U.S. PATENT DOCUMENTS 4,869,857 A    9/1989   Itoh et al.
6,165,363 A *  12/2000  Oishi ..................... B01D 69/02
                                                    210/500.23
(Continued)

FOREIGN PATENT DOCUMENTS

JP    S60-246812 A    12/1985
JP    S63-20339       1/1988
(Continued)

OTHER PUBLICATIONS

Qin et al., "Development of high flux polyethersulfone hollow fiber ultrafiltration membranes from a low critical solution temperature dope via hypochlorite treatment," Journal of Membrane Science, 247 (2005) 137-142.
(Continued)

*Primary Examiner* — Ana M Fortuna
(74) *Attorney, Agent, or Firm* — Greenblum & Bernstein, P.L.C.

(57) ABSTRACT

A porous membrane has a thickness of 150 μm or greater. The pore diameters of a first surface are smaller than the pore diameters of a second surface. The average value of the pore diameters of the first surface is 60 nm or less, and the coefficient of variation of the pore diameters is 10% or greater and 50% or less.

13 Claims, 1 Drawing Sheet

(51) Int. Cl.
*B01D 71/68* (2006.01)
*B01D 69/08* (2006.01)
*B01D 67/00* (2006.01)
*B01D 71/52* (2006.01)
*B01D 61/14* (2006.01)
*B01D 71/44* (2006.01)
*C08J 9/28* (2006.01)
*D01F 6/12* (2006.01)

(52) U.S. Cl.
CPC ............ *B01D 71/34* (2013.01); *B01D 71/68* (2013.01); *C08J 9/28* (2013.01); *D01F 6/12* (2013.01); *B01D 61/145* (2013.01); *B01D 69/08* (2013.01); *B01D 71/44* (2013.01); *B01D 71/52* (2013.01); *B01D 2323/02* (2013.01); *B01D 2325/022* (2013.01); *B01D 2325/04* (2013.01); *B01D 2325/06* (2013.01); *B01D 2325/20* (2013.01); *B01D 2325/24* (2013.01); *B01D 2325/28* (2013.01); *B01D 2325/34* (2013.01)

(58) Field of Classification Search
CPC .... B01D 63/02; B01D 67/0016; B01D 71/34; B01D 2323/12; B01D 2325/022
See application file for complete search history.

(56) References Cited

U.S. PATENT DOCUMENTS

| | | | |
|---|---|---|---|
| 2008/0210624 A1* | 9/2008 | Li | D01F 6/32 210/500.23 |
| 2009/0101600 A1 | 4/2009 | Shiki et al. | |
| 2012/0012521 A1 | 1/2012 | Takahashi et al. | |
| 2012/0318729 A1* | 12/2012 | Yip | B01D 61/002 210/490 |
| 2016/0052804 A1 | 2/2016 | Nasaka et al. | |
| 2016/0220965 A1 | 8/2016 | Hayashi et al. | |
| 2018/0169590 A1* | 6/2018 | Yabuno | B01D 71/34 |

FOREIGN PATENT DOCUMENTS

| | | |
|---|---|---|
| JP | S63-267406 | 11/1988 |
| JP | H2-164428 | 6/1990 |
| JP | 2006-239680 A | 9/2006 |
| JP | 2010-94670 A | 4/2010 |
| JP | 2010-233999 A | 10/2010 |
| JP | 2014-76446 A | 5/2014 |
| WO | 1997/22405 | 6/1997 |
| WO | 2007/119850 A1 | 10/2007 |
| WO | 2010-082437 A1 | 7/2010 |
| WO | 2014/156644 A1 | 10/2014 |
| WO | 2015/041286 A1 | 3/2015 |
| WO | 2015/046411 A1 | 4/2015 |

OTHER PUBLICATIONS

Qin et al., "Hollow fiber ultrafiltration membranes with enhanced flux for humic acid removal," Journal of Membrane Science, 247 (2005) 119-125.
Supplementary European Search Report for corresponding application EP17813341.9, dated Oct. 22, 2019.
International Search Report for International Patent Application No. PCT/JP2017/021919, dated Oct. 17, 2017, along with an English translation thereof.
International Written Opinion for International Patent Application No. PCT/JP2017/021919, dated Oct. 17, 2017, along with an English translation thereof.
International Preliminary Report on Patentability for International Patent Application No. PCT/JP2017/021919, dated Dec. 18, 2018, along with an English translation thereof.
Yeow et al., "Preparation of porous PVDF hollow fibre membrane via a phase inversion method using lithium perchlorate (LiClO4) as an additive," Journal of Membrane Science, 258 (2005) 16-22.
Supplemental European Search Report for EP 17813341.9, dated Jun. 24, 2019.

* cited by examiner

POROUS MEMBRANE AND PROCESS FOR PRODUCING POROUS MEMBRANE

CROSS REFERENCE TO RELATED APPLICATIONS

The present application is a National Phase Entry of International Patent Application No. PCT/JP2017/021919 filed on Jun. 14, 2017, claiming priority to Japanese Patent Application No. 2016-120663 filed on Jun. 17, 2016. The contents of these applications are incorporated herein by reference in its entirety.

TECHNICAL FIELD

The present disclosure relates to a porous membrane and a method for producing a porous membrane.

BACKGROUND ART

Filtration processes have been widely used in industrial fields, such as sterile water production, high purity water production, or drinking water production, and air purification. In addition, the range of usage for filtration processes has been expanding in recent years. Examples of such use include secondary treatment or tertiary treatment at sewage treatment plants for domestic wastewater and industrial wastewater, as well as separation of solids and liquids and highly turbid water treatment in septic tanks.

Hollow fiber membranes, in which polymers having superior processing properties are formed into hollow tubular shapes, or membrane modules, which are collections of flat membranes in which polymers are formed into sheet shapes, are being employed as filter materials to be used in such filtration processes.

Particularly in cases that water from rivers is clarified and used as tap water or the like, three types of performance, which are high blocking properties, high permeability to enable a large quantity of water to be treated, and high operating strength that can be used for a long time under a wide range of operating conditions including high operating pressure, are required. In the case of porous hollow fiber membranes, external pressure filtration systems which are capable of securing a large filtration area are mainly used. Therefore, high strength, that is, high compression resistance, is desired such that the hollow fiber membranes are not crushed during filtering operations.

Among the three types of performance required of the porous membranes which are used in a membrane module, in the field of water treatment, blocking properties that can positively remove viruses and bacteria are important, as this property influences the water quality of filtered water.

Japanese Unexamined Patent Publication No. 2010-94670 and International Patent Publication No. WO2015/041286 disclose techniques that suppress deterioration in the permeability of porous hollow fiber membranes which are utilized to remove bacteria, viruses, and suspended solid (SS) components, in which the pore diameters at the outer surface of a separation function layer (porous membrane layer) are formed to be sufficiently smaller than the average diameter of the targets for removal, and the layer thickness is formed to be thin. Reduction in strength due to the layer thickness being thin is prevented by laminating the separation function layer on a support to form a composite membrane. However, in the field of water treatment, high pressure is repeatedly applied in an external pressure direction and an internal pressure direction of the porous membrane.

Therefore, peeling of the separation function layer from the support may occur during filtering operations due to repetitive use over long periods of time, in the composite membrane in which a separation functional layer is laminated on a support as disclosed in Japanese Unexamined Patent Publication No. 2010-94670 and International Patent Publication. No. WO2015/041286. For this reason, the composite membranes disclosed in Japanese Unexamined Patent Publication No. 2010-94670 and International Patent Publication No. WO2015/041286 cannot maintain strength over a long period of time, stable long term filtering operations are difficult.

SUMMARY

The present disclosure provides a porous membrane which has high blocking performance suitable for use in filtration, has superior water permeability, and is capable of performing stable long term filtering operations. The present disclosure also provides a production method capable of stably producing such a porous membrane.

The inventors of the present disclosure conducted intensive studies in order to achieve the above objective, and reached the present disclosure as a result. That is, the present disclosure is as follows.

A porous membrane of the present disclosure is that which has a thickness of 150 μm or greater, and in which the average value of the pore diameters of a first surface is smaller than the average value of the pore diameters of a second surface, and is characterize by the average value of the pore diameter of the first surface being 60 nm or less, and the coefficient of variation of the pore diameters being 10% or greater and 50% or less.

It is preferable for the porous membrane of the present disclosure to have a three dimensional mesh structure, and a coefficient of water permeability $P (=F/D)$ expressed by the ratio of the pure water permeability F to the membrane thickness D is 5200 [L/m$^2$/hr/mm] or greater.

It is preferable for the porous membrane of the present disclosure to be composed of a single layer and to have a compressive strength of 0.40 MPa or greater.

It is preferable for the porous membrane of the present disclosure to have pores with pore diameters of 2.0 μm or greater at positions within a range from 0.6 to 0.9 in the direction of membrane thickness in a membrane thickness normalized with the first surface designated as 0 and the second surface designated as 1.

In the porous membrane of the present disclosure, it is preferable for the average value of the pore diameters of the second surface is three times or greater than the average value of the pore diameters of the first surface.

It is preferable for the porous membrane of the present disclosure to include a vinylidene fluoride resin as a main component.

It is preferable for the porous membrane of the present disclosure to be formed by a vinylidene fluoride resin and a resin that includes polyethylene glycol having a weight average molecular weight of 20,000 or greater and 300,000 or less, and for the polyethylene glycol to be included at an amount of 0.01 parts by weight or greater and 4.0 parts by weight or less with respect to 100 parts by weight of the vinylidene fluoride resin.

It is preferable for the porous membrane of the present disclosure to include a pulysulfone resin as a main component.

In the porous membrane of the present disclosure, it is preferable for the average value of the pore diameters of the first surface to be 5 nm or greater.

It is preferable for the thickness of the porous membrane of the present disclosure to be 200 μm or greater.

The method for producing a porous membrane of the present disclosure is a process for producing a porous membrane, and includes:

extruding a membrane forming stock solution that includes at least a hydrophobic polymer component, a hydrophilic polymer component, and a common solvent of the hydrophobic polymer component and the hydrophilic polymer component from a forming nozzle; and causing the membrane forming stock solution to solidify in a solution having water as a main component;

the percentage of moisture in the hydrophilic polymer being 3.0% or less.

In the method for producing a porous membrane of the present disclosure, it is preferable for the amount of time that the membrane forming stock solution to be present within the solution in the step of solidifying the membrane forming stock solution in a solution to be 5.0 seconds or greater.

In the method for producing a porous membrane of the present disclosure, it is preferable for the porous membrane to be formed into a hollow fiber shape, and for the solvent, which is used as a common solvent for the membrane forming stock solution, mixed with water at a weight ratio within a range from 25 to 95, to be employed as a hollow forming agent.

In the method for producing a porous membrane of the present disclosure, it is preferable for the hydrophobic polymer component to be a vinylidene fluoride resin.

In the method for producing a porous membrane of the present disclosure, it is preferable for the hydrophilic polymer component to be polyethylene glycol having a weight average molecular weight of 20,000 or greater and 150,000 or less.

In the method for producing a porous membrane of the present disclosure, it is preferable for the hydrophobic polymer component to be a polysulfone resin.

According to the present disclosure, it is possible to provide a porous membrane which has high blocking performance suitable for use in filtration, has superior water permeability, and is capable of performing stable long term filtering operations. The present disclosure also provides a production method capable of stably producing such a porous membrane.

DETAILED DESCRIPTION OF THE PREFERRED EMBODIMENTS

Figure 1:
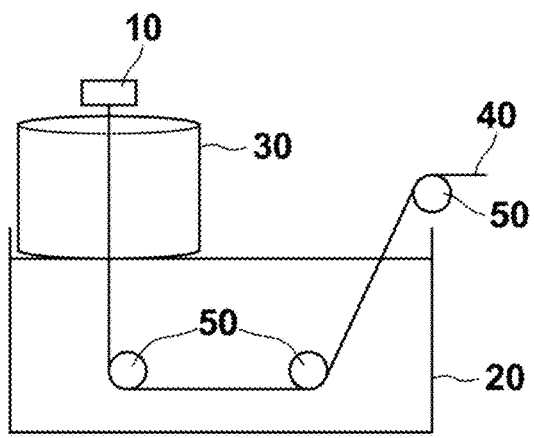
FIG. 1 illustrates an example of a manufacturing apparatus for a case that a hollow porous membrane is produced.

Hereinafter, preferred embodiments of the present disclosure will be described in detail.

In the porous membrane of the present embodiment, the pore diameter of a first surface is smaller than the pore diameter of a second surface, the average value of the pore diameters of the first surface is 60 nm or less, and the coefficient of variation of the pore diameter is 10% or greater and 50% or less. The pore diameters of the surfaces of the porous membrane are measured according to a method of measuring the inner and outer surface pore diameters of the surfaces, to be described below.

The porous membrane of the present embodiment is produced from a polymer component having a vinylidene fluoride resin, a hexafluoropropylene resin, or a polysulfone resin as a main component, for example. Examples of the polysulfone resin include polysulfone, polyether sulfone, and the like.

Note that the following description will be regarding a vinylidene fluoride resin. However, but the polymer component that forms the porous membrane of the present disclosure is not limited thereto. The vinylidene fluoride resin may be a homopolymer of vinylidene fluoride or a copolymerized polymer containing vinylidene fluoride in a molar ratio of 50% or greater. From the viewpoint of superior strength, the vinylidene fluoride resin is preferably a homopolymer. When the vinylidene fluoride resin is a copolymerized polymer, it may be copolymerized with a known copolymerizable monomer, which is not particularly limited. Examples of such known copolymerizable monomers include fluorine monomers, chlorine monomers, etc. Note that the weight average molecular weight (Mw) of the vinylidene fluoride resin is not particularly limited. However, it is preferable for the weight average molecular weight of the vinylidene fluoride resin to be 100,000 or greater and 1,000,000 or less, and more preferably 150,000 or greater and 900,000 or less. Further, the vinylidene fluoride resin is not limited to a single molecular weight vinylidene fluoride resin, and a plurality of vinylidene fluoride resins having different molecular weights may be mixed.

Here, "having . . . as a main component" means that a component is included at an amount of 50% by weight or greater in terms of solid content of the polymer component. In addition, although the porous membrane is not particularly limited, it is preferable for the porous membrane to include vinylidene fluoride resin at an amount of 80% by weight or greater and 99.99% by weight or less as the main component of the polymer component. Meanwhile, the porous membrane may contain other polymer components. The other polymer components are not particularly limited, those which are compatible with vinylidene fluoride resin are preferred. For example, fluorine resins or the like that exhibit high chemical resistance similar to that of the vinylidene fluoride resin may be favorably employed.

Further, it is preferable for the porous membrane to include a hydrophilic resin as another polymer component. It is preferable for the hydrophilic resin to be polyethylene glycol (sometimes referred to as polyethylene oxide) having a weight average molecular weight (Mw) of 20,000 or greater and 300,000 or less or polyvinyl pyrrolidone having a K value as an index of molecular weight of 17 or greater and less than 120.

In the case that polyethylene glycol is the hydrophilic resin, it is preferable for the polyethylene glycol to be included at an amount of 0.01 parts by weight or greater and 4.0 parts by weight or less, based on 100 parts by weight of the vinylidene fluoride resin. It is more preferable for the amount of the polyethylene glycol to be within a range from 0.01 parts by weight to 3.5 parts by weight, and even more preferably within a range from 0.01 part by weight to 3.0 parts by weight. By the porous membrane including polyethylene glycol, the hydrophilicity of the membrane surface is increased, and formation of a water molecule layer on the membrane surface when brought into contact with an aqueous solution is facilitated. Therefore, it is presumed that the water molecule layer which is formed on the membrane surface causes the frequency of contact between the polymer component that constitutes the porous membrane and cleansing chemicals to be reduced. As a result, the chemical resistance of the porous membrane can be improved. Here, if the weight average molecular weight (Mw) of the polyethylene glycol is less than 20,000, there is a tendency for elution from the membrane to increase. Conversely, if the weight average molecular weight (Mw) of polyethylene glycol is greater than 300,000, a portion at which polyethylene glycol is included in spherical form will be formed in the porous body that forms the porous membrane, and there is a tendency for the strength of the porous body to decrease. Meanwhile, if the content of polyethylene glycol is less than 0.01 parts by weight, there is a tendency that it is difficult for the water molecule layer to be formed, and if the content of polyethylene glycol is greater than 4 parts by weight, the polyethylene glycol will excessively attract water molecules and the membrane will swell. As a result, there is a tendency for water permeability to decrease.

The manner in which the polyethylene glycol is included is not particularly limited, and for example, polyethylene glycol molecules may be present only on the surface layer of the porous body by being applied by coating or graft polymerization or the like. However, it is more preferable for at least a portion of the polyethylene glycol molecules to be embedded within the skeleton of the porous body, from the viewpoint of maintaining the effect of improving chemical resistance over a long period of time. In either of the manners in which the polyethylene glycol is included, the effect of improving chemical resistance will be exhibited. However, in the case that the polyethylene glycol is imparted to the surface layer of the porous body by coating or the like, the polyethylene glycol will elute over time when the porous body is utilized in water. In the case that the glycol is physically bound to the surface layer of the porous body by graft polymerization, the binding sites will be cleaved by cleansing chemicals when the membrane is cleansed. In both these cases, there is a tendency that it will be difficult to maintain the effect of improving chemical resistance over a long period of time.

A case in which polyethylene glycol is employed as the hydrophilic resin has been described above. However, the present disclosure is not particularly limited to employing polyethylene glycol.

The form of the above porous membrane may be a hollow fiber membrane, for example. Here, the hollow fiber membrane refers to a membrane having a hollow annular form. By the porous membrane being that having a hollow fiber membrane structure, it will become possible to increase the membrane area per module unit volume to be greater than that of a planar membrane. However, the porous membrane of the present disclosure is not limited to a porous membrane having a hollow fiber membrane structure (hollow fiber porous membrane), and may have other membrane structures, such as a planar membrane structure and a tubular membrane structure.

In the field of water treatment, it is desired for viruses, bacteria, etc. to be removed. The above porous membrane is employed such that the first surface thereof is a raw water side. The average value of the pore diameters of the raw water side surface is set to be 60 nm or less, and the coefficient of variation (=(standard deviation/average value)×100) of the pore diameters is set to be 10% or greater and 50% or less. By adopting this configuration, high blocking performance can be exhibited, while deterioration in water permeability can be suppressed. The smaller the coefficient of variation is, the sharper the pore diameter distribution, and the sharper the pore diameter distribution is, the lower number of pores having pore diameters greater than the average value. As a result, deterioration in blocking performance can be suppressed, and therefore high blocking performance can be exhibited, while obviating decreases in the pore diameters on the surface more than necessary. Thereby, deterioration in water permeability can be suppressed. In addition, if the coefficient of variation is 10% or greater, stable production becomes possible. It is desirable for the coefficient of variation to be 10% or greater and 45% or less, and more desirably 10% or greater and 40% or less.

In addition, because deterioration in water permeability is suppressed, thinning of a membrane having the function of separating objects to be removed becomes unnecessary. Therefore, it is possible to form the porous membrane as a single membrane, without being laminated as in the composite membranes disclosed in Japanese Unexamined Patent Publication No. 2010-94670 and International Patent Publication No. WO2015/041286. Accordingly, in the present embodiment, it is possible to form the porous membrane as a single membrane. For this reason, the peeling phenomenon that occurs in composite membranes cannot occur, and it becomes possible to maintain strength over a long term, to enable stable filtering operations over a long period of time.

Note that it is more preferable for the average value of the pore diameters of the first surface to be 5 nm or greater and 50 nm or less, and for the coefficient of variation of the pore diameter to be 10% or greater and 40% or less. It is even more preferable for the average value of the pore diameters to be 5 nm or greater and 40 nm or less, and for the coefficient of variation of the pore diameters to be 10% or greater and 35% or less.

Further, it is preferable for the porous membrane to have a three dimensional mesh structure. With a three dimensional mesh structure, communication properties among adjacent pores will be favorable, resistance when water passes through the porous membrane will be small, and high water permeability can be exhibited. The communication properties can be expressed by the ratio of the membrane thickness of the porous membrane and pure water permeability. For example, a structure in which spherical crystals are connected or an independent foam structure having poor communication properties among pores will have a high resistance at a portion of membrane thickness. Therefore, the ratio of the membrane thickness of the porous membrane and pure water permeability will become small. In contrast, the ratio of the membrane thickness of the porous membrane and pure water permeability will become large in a three dimensional mesh structure. If the pure water permeability is designated as F, the membrane thickness of the porous membrane is designated as D, the ratio of the membrane thickness of the porous membrane, and the pure water permeability is defined as P=coefficient of water permeability, P=F/D. In the present embodiment, if the coefficient of water permeability P is 5200 $L/m^2/hr/mm$ or greater, the porous membrane has a three dimensional mesh structure and exhibits high water permeability. It is preferable for the coefficient of water permeability P to be 5800 $L/m^2/hr/mm$ or greater, and more preferable for the coefficient of water permeability P to be 6200 $L/m^2/hr/mm$ or greater. Further, the membrane thickness is 150 μm or greater, and more preferably 200 μm or greater. If the membrane thickness is 150 μm or greater, the structure of the porous membrane can be maintained against pressure during filtration.

In the case that the above porous membrane is formed to have a hollow fiber membrane structure, an external pressure filtration method which is capable of securing a large filtration area is mainly employed. For this reason, it is required for the porous hollow fiber membrane to have high strength with respect to an external pressure direction, that is, high compression resistance strength, such that the hollow fiber membrane will not be crushed during filtering operations. The porous membrane of the present embodiment is capable of having a compression resistance strength of 0.40 MPa or greater. If the compression resistance strength is 0.40 MPa or greater, the shape of the porous membrane can be maintained for a long period of time, in the field of water treatment, in which operating pressure is applied for a long period of time.

In the case that the porous membrane has a hollow fiber membrane structure, it is preferable for the inner diameter of the hollow portion of the hollow fiber membrane to be 0.10 mm or greater and 5.0 mm or less, and for the outer diameter thereof to be 0.15 mm or greater and 6.0 mm or less.

As a method for measuring the virus blocking performance of the porous membrane, measurements can be performed employing *Escherichia coli* phage MS-2. Regarding a test method, index bacteria of a predetermined size are cultured, and a virus stock solution is prepared in distilled water such that the index bacteria are contained at a concentration of $1.0 \times 10^7$ pfu/ml, and total filtration is performed. The concentration of the bacteria in the stock solution is designated as a numerator, the concentration of the bacteria in the filtered solution is designated as a denominator, and the ratio thereof is represented as a common logarithm (LRV). In the porous membrane of the present embodiment, it is preferable for the LRV to be 1.5 or greater, and more preferably 1.6 or greater.

In order to further improve permeability, it is preferable to employ the porous membrane such that the raw water side is the first side having smaller pore diameters, and the pore diameters on the filtrate side are larger than those on the raw water side. Thereby, the resistance when a liquid passes through the membrane in the cross sectional direction thereof can be reduced, and the permeability can be increased. In addition, because the pore diameters at the raw water side are small, clogging in the cross sectional direction of the membrane due to substances that cause contamination of the membrane can be suppressed.

The average value of the pore diameters of the second surface may be three times or greater than the average value of the pore diameters of the surface having the small pore diameter. Thereby, high water permeability can be exhibited. It is preferable for the average value of the pore diameters of the second surface to be three times or greater and 700 times or less than the average value of the pore diameters of the surface having the small pore diameter. It is more preferable for the average value of the pore diameters of the second surface to be four times or greater and 650 times or less than the average value of the pore diameters of the surface having the small pore diameter. High water permeability and high compression resistance strength can be exhibited within this range.

In addition, in the case that the membrane thickness is normalized with the surface on the raw water side (the first surface) designated as 0 and the surface on the filtrate side (the second surface) designated as 1, high water permeability can be exhibited if pores having pore diameters of 2.0 μm or greater are present at positions within a range from 0.6 to 0.9 when taking a pore diameter profile in the membrane thickness direction. Due to the presence of pores with a pore diameter of 2.0 μm or greater at positions within a range from 0.6 to 0.9, resistance during filtration is reduced, and substances which cause deterioration of the membrane performance will not accumulate in the cross sectional direction of the membrane. As a result, it is possible to suppress deterioration in performance.

Next, a method for producing the porous membrane of the above embodiment will be described.

The porous membrane of the above embodiment is produced by a so called wet membrane forming method, in which a membrane forming stock solution (spinning stock solution) which preferably includes at least a hydrophobic polymer component containing a vinylidene fluoride resin, a hexafluoropropylene resin, or a polysulfone resin as a main component, a hydrophilic polymer component, and a common solvent for the hydrophobic and hydrophilic polymer components is extruded from a forming nozzle, to be solidified in a solution including water as a main component.

Alternatively, the porous membrane of the above embodiment is produced by a so called dry wet membrane forming method, in which the membrane forming stock solution is extruded from a forming nozzle, and a predetermined spatial running section is secured thereafter. Here, the hydrophobic polymer and the hydrophilic polymer in the present disclosure are those in which that having a critical surface tension (γc) at 20° C. of 50 (mN/m) or greater is classified as a hydrophilic polymer and that having a critical surface tension (γc) at 20° C. of less than 50 (mN/m) or greater is classified as a hydrophobic polymer.

Further, the membrane forming stock solution may contain a non solvent for the hydrophobic polymer as necessary.

In the production method of the present embodiment, first, a hydrophobic polymer component for forming a porous membrane containing a vinylidene fluoride resin as a main component and a hydrophilic polymer component as a hydrophilizing component are dissolved in a common solvent for the hydrophobic and hydrophilic polymer components, to prepare a porous membrane forming membrane stock solution.

The hydrophobic polymer component for forming the porous membrane may be a vinylidene fluoride resin having a single molecular weight or a mixture of a plurality of vinylidene fluoride resins having different molecular weights. In addition, in order to improve the properties of the porous membrane, the hydrophobic polymer component is not limited to hydrophobic polymers, and one or more types of other polymers may be mixed therein.

In the case that other types of polymers are mixed into the hydrophobic polymer component, the other polymers are not particularly limited as long as they are compatible with the vinylidene fluoride resin. For example, if it is desired to impart hydrophilicity to the membrane, a hydrophilic polymer may be employed. Alternatively, if it is desired to further increase the hydrophobicity, a hydrophobic polymer, preferably a fluorine based polymer or the like, may be employed. In the case that other types of polymers are mixed into the hydrophobic polymer component, it is preferable for the vinylidene fluoride resin to be included in an amount of 80% or greater, and more preferably 90% or greater, in terms of the solid content of all of the polymer components.

In the production method of the present embodiment, it is preferable for polyethylene glycol (sometimes referred to as polyethylene oxide) having a weight average molecular weight (Mw) of 20,000 or greater and 150,000 or less to be employed as the hydrophilic polymer component as a hydrophilizing component to be blended into the membrane forming stock solution. It is possible to produce a porous membrane even if polyethylene glycol having a weight average molecular weight of less than 20,000 is used.

However, there is a tendency for forming a porous membrane having pore diameters that satisfy the present disclosure to become difficult. If the weight average molecular weight of the polyethylene glycol is greater than 150,000, there is a tendency for the polyethylene glycol to be uniformly dissolved to be difficult in the spinning stock solution which has the vinylidene fluoride resin as the main component of the hydrophobic polymer component that is to form the porous membrane. From the viewpoint of obtaining a spinning stock solution which has superior membrane formability, the weight average molecular weight of polyethylene glycol is more preferably 20,000 or greater and 120,000 or less. From the viewpoint of obtaining a spinning stock solution which has superior membrane formability and is capable of maintaining a balance between crystallinity and specific surface area, the proportion of polyethylene glycol in the hydrophilic polymer component is preferably 80% or greater, more preferably 90% or greater, and even more preferably 95% or greater, in terms of the solid content of the hydrophilic polymer component.

As described in the above embodiment, polyethylene glycol is preferably used as the hydrophilic polymer component in the production method of the present disclosure, but the hydrophilic polymer component is not limited to polyethylene glycol. Polyvinylpyrrolidone or partially saponified polyvinyl alcohol may be employed as alternatives. As a further alternative, two or more types of hydrophilic polymer components may be mixed and employed.

The hydrophilic polymer component that satisfies the above requirement may be a single existing industrial product, or may be prepared by mixing several types of industrial products. Further, the hydrophilic polymer may be that which is produced from a raw material having a great weight average molecular weight, which is processed into a hydrophilic polymer having an appropriate weight average molecular weight, by chemical or physical treatment.

Examples of the non solvent for the hydrophobic polymer include water and alcohol compounds. Among these, glycerin is preferable from the viewpoints of ease of preparation of the manufacturing stock solution, distribution formation of the hydrophilic polymer, difficulty in change in composition during storage, ease of handling, etc.

In addition, it is preferable for the water content contained in the hydrophilic polymer to be 3.0% or less. If the water content is 3.0% or less, the coefficient of variation of the pore diameters of the outer surface can be reduced to 50% or less. It is more preferable for the water content to be 2.5% or less, and even more preferably 2.0% or less. This is because if the amount of water, which is a non solvent, is small in the hydrophilic polymer forming a dilution phase in phase separation, fluctuations in phase separation time will be reduced, and the coefficient of variation of the pore diameter can be decreased. Furthermore, as a result, the blocking performance with respect to viruses can be improved. This is because if the pore diameter distribution is narrow, deterioration of the blocking performance in the portion where the pore diameters are large can be suppressed, thereby achieving the aforementioned virus blocking performance. Water content can be measured by an infrared moisture meter or by the Karl Fischer method.

Furthermore, it is preferable for the vinylidene fluoride resin which is employed in the membrane forming stock solution to include a heterogeneous sequence at a certain ratio, because a membrane having superior chemical resistance can be obtained. For example, in the case of a PVDF (polyvinylidene fluoride) resin, it is preferable to use one having a heterogeneous sequence ratio of 8.0% or greater and less than 30.0% within molecules according to $^{19}$F-NMR measurement.

The heterogeneous sequence ratio of PVDF resin can be measured as follows. $^{19}$F-NMR measurement of the porous membrane is carried out using Lambda 400 manufactured by JEOL Ltd. as an NMR measuring apparatus, using $d_6$-DMF as a solvent and $CFCl_3$ (0 ppm) as an internal standard. Calculations are performed according to Formula (1) below, using an integrated value (Ir) of signals derived from a normal sequence appearing in the vicinity of −92 to −97 ppm in an obtained spectrum and an integrated value (Ii) of signals derived from the heterologous sequence appearing in the vicinity of −114 to −117 ppm.

Heterogeneous sequence ratio (%)={Ii/(Ir+Ii)}×100    (1)

Further, the mixing ratio of the hydrophobic polymer component and the hydrophilic polymer component in the membrane forming stock solution is not particularly limited, but it is preferable for the hydrophobic polymer component to be included at 20% by weight or greater and 40% by weight or less, for the hydrophilic polymer component to be include at 8% by weight or greater and 30% by weight or less, and for the remainder to be the solvent. It is more preferable for the hydrophobic polymer component to be included at 23% by weight or greater and 35% by weight or less, for the hydrophilic polymer component to be included at 10% by weight or greater and 25%, and for the remainder to be the solvent. By forming the porous membrane using the membrane forming stock solution within this range, adjustment of the remaining amount of the hydrophilic polymer component to a predetermined amount will be facilitated, and obtainment of a porous membrane having high strength as well as superior chemical resistance and water permeability will be facilitated.

In the above manufacturing method, it is preferable for a relationship Tb≤Td+50 to be satisfied between the solution temperature (Tb °C.) of a solution containing water as a main component, in which the membrane forming stock solution solidifies during membrane formation, and the temperature (Td °C.) of the membrane forming stock solution. In addition, it is preferable for a relationship Tc≤Tb to be satisfied between the solution temperature Tb and a turbidity point temperature (Tc °C.) of the membrane forming stock solution. By forming a membrane under conditions that satisfy the relationships of such temperature ranges, a porous membrane with high water permeability can be obtained, and the diffusion rate of the solidifying liquid will be increased. As a result, solidification will be completed with at least a part of the hydrophilic polymer component being embedded in the skeleton of the porous body. Therefore, it will become possible to adjust the remaining amount of the hydrophilic polymer component to a desired range.

Further, in the production method described above, in the case that a porous membrane is produced in the form of hollow fibers, it is preferable for a double tubular nozzle to be employed as the forming nozzle during production, for the membrane forming stock solution to be extruded from the double tubular nozzle together with a hollow forming agent, and for the membrane forming stock solution to solidify in a solution tank in which the above solution is contained. Thereby, a porous membrane having a membrane structure of a hollow fiber membrane can be easily produced. The double tubular forming nozzle and the hollow forming agent to be employed are not particularly limited, and known double tubular forming nozzles and hollow forming agents which are commonly employed in this technical field may be employed. In the present specification, the porous membrane having a membrane structure of a hollow fiber membrane will also be referred to as a porous hollow fiber membrane.

An example of a manufacturing apparatus for producing the porous hollow fiber membrane is illustrated in FIG. 1. The apparatus for producing the porous hollow fiber membrane is equipped with a double tubular forming nozzle 10, a solution tank 20 in which a solution for solidifying the membrane forming stock solution is contained, a solution tank for discharging the membrane forming stock solution to be discharged from the forming nozzle 10, a container 30 that covers the spatial running section through which the membrane forming stock solution passes before reaching the solution in the solution tank 20, and a plurality of rollers 50 for conveying and winding the porous hollow fiber membrane 40.

The membrane forming stock solution which is extruded from the double tubular forming nozzle 10 passes through the solution tank 20 via the spatial running section. It is preferable for the amount of time for which the membrane forming stock solution passes through the spatial running section to be within a range from 0.2 to 10 seconds. Further, in order to form the hollow portion, a hollow forming agent is caused to flow in the innermost annular ring of the double tubular forming nozzle 10. The hollow forming agent may be an aqueous solution obtained by mixing a common solvent of the membrane forming stock solution and water so that the weight ratio of the common solvent is 25 to 95 (here, the weight ratio is the percentage by weight of the common solvent with respect to the aqueous solution). The pore diameter on the inner surface side of the porous hollow fiber membrane can be controlled by employing the aqueous solution which is mixed in this manner. Here, if the weight ratio is 25 or greater, the pore diameter on the inner surface side (the surface with large pore diameters in this case) side can be formed to be three times or greater the pore diameter on the outer surface side (the surface with small pore diameters in this case), and high permeability can be exhibited. If the weight ratio is greater than 95, solidification at the inner surface side will be slow, and the spinning stability will be extremely poor.

Further, it is desirable for the amount of time that the membrane forming stock solution resides in the solution tank (in the solution) to be 5.0 seconds or greater. When the amount of time that the membrane forming stock solution resides in the solution tank is set to 5.0 seconds or greater, a time period, during which the common solvent of the membrane forming stock solution which is present on the inner surface from the central portion of the membrane thickness diffuses and is exchanged with the non-solvent in the solution tank, can be secured. Therefore, solidification is promoted and phase separation is ceased in an appropriate state. As a result, the communication properties of the cross section of the membrane structure will be improved. In addition, if the amount of time that the membrane forming stock solution resides in the solution tank is long, the time during which contraction occurs in the vicinity of the outer surface of the cross section of the porous membrane will become long. As a result, it will be possible for the porous membrane to be that having pores with pore diameters of 2.0 μm or greater at positions within a range from 0.6 to 0.9 in the direction of membrane thickness, in a membrane thickness normalized with the first surface designated as 0 and the second surface designated as 1.

It is more desirable for the amount of time that the membrane forming stock solution resides in the solution tank to be within a range from 5.0 seconds to 50 seconds. If the amount of time that the membrane forming stock solution resides in the solution tank is 50 seconds or less, the process will become short and simplified. It is more desirable for the amount of time that the membrane forming stock solution resides in the solution tank to be within a range from 6.0 to 45 seconds. The solution tank may be provided as a single stage or as two or more stages depending on the purpose. In the case that a plurality of solution tanks are provided, the total amount of time that the membrane forming stock solution resides in the solution tanks at each stage may be within the above range.

The temperature of the solution tank is not particularly limited as long as it satisfies the above relationships, but is preferably 45° C. or greater and 95° C. or less, and more preferably 50° C. or greater and 90° C. or less. In the case that a plurality of solution tanks are provided, the temperature conditions may be changed for each solution tank.

In addition, a container for controlling the temperature and humidity of the spatial running section may be provided in the spatial running section. Regarding this container, there is no particular limitation on the shape thereof or the like. The container may be, for example, of a prismatic shape or a cylindrical shape. The container may also be sealed or open.

The temperature environment of the spatial running section is preferably 3° C. or greater and 90° C. or less. Stable temperature control is possible within this range, and spinning properties can be maintained. It is desirable for the temperature of the spatial running section to be within a range from 5° C. to 85° C. In addition, the relative humidity is within a range from 20 to 100%.

Furthermore, the common solvent to be employed in the membrane forming stock solution is not particularly limited, as long as it dissolves the aforementioned hydrophobic and hydrophilic polymer components, and a known solvent can be appropriately selected and used. From the viewpoint of improving the stability of the membrane forming stock solution, it is preferable for at least one solvent selected from a group consisting of N-methylpyrrolidone (NMP), dimethylformamide (DMF), dimethylacetamide (DMAc) and dimethylsulfoxide (DMSO) to be employed. In addition, a mixture of at least one common solvent selected from the above group and another solvent may be employed. In this case, it is preferable to employ a mixture that includes the common solvents selected from the above group at a total of 80% by weight or greater, and more preferably 90% by weight or greater, based on the total amount of the mixture.

Heat treatment may be performed as necessary following membrane formation. The temperature of the heat treatment is preferably 45° C. or greater and 100° C. or less, more preferably 50° C. or greater and 95° C. or less. The coefficient of variation of the outer diameters can be suppressed by contraction of the membrane, and the heat treatment can be performed without significantly lowering the water permeability, within this temperature range.

By using these production methods, a porous hollow fiber membrane having high blocking performance, which has superior permeability and strength that cannot be achieved by a conventional porous membrane, and which is capable of stable filtering operations over a long period of time, can be easily and stably produced.

EXAMPLES

Hereinafter, the present disclosure will be described more specifically with reference to Examples and Comparative Examples, but the present disclosure is not limited to these examples. Porous hollow fiber membranes (hereinafter sometimes simply referred to as hollow fiber membranes) composed of porous membranes of the Examples and Comparative Examples of the present disclosure were produced and evaluated. The measurement methods that were employed are as follows. The following measurements were conducted at 25° C. unless otherwise noted. The production methods and the evaluation results for the Examples and Comparative Examples will be described after describing the evaluation method.

[1] Measurements of Outer Diameters and Inner Diameters (Mm)

Hollow fiber membranes were cut thinly by a razor blade or the like in a direction perpendicular to the longitudinal direction of the membrane. The long axis and the short axis of the inner diameters of the cross section as well as the long axis and the short axis of the outer diameters were measured using a microscope. The inner diameters and the outer diameters were respectively determined according to Formulae (2) and (3) below. In addition, membrane thicknesses D were expressed by Formula (4).

$$\text{Inner Diameter [mm]} = \frac{\text{inner diameter long axis[mm]} + \text{inner diameter short axis [mm]}}{2} \quad (2)$$

$$\text{Outer Diameter [mm]} = \frac{\text{outer diameter long axis[mm]} + \text{outer diameter short axis [mm]}}{2} \quad (3)$$

$$\text{Membrane Thickness [mm]} = \frac{\text{Outer Diameter [mm]} - \text{Inner Diameter [mm]}}{2} \quad (4)$$

[2] Pure Water Permeability (L/m²/Hr)

One of the ends of the wet hollow fiber membranes having a length of about 10 cm was sealed and an injection needle was placed in the hollow portion at the other end. Pure water at a temperature of 25° C. was injected into the hollow portion from the injection needle at a pressure of 0.1 Mpa. Pure water permeability F was determined by Formula (5) below. Here, the effective membrane length refers to a net membrane length excluding the portion where the injection needle is inserted.

$$\text{Pure Water Permeability}\left[\frac{L}{\frac{m^2}{hr}}\right] = \frac{60\left[\frac{\text{minutes}}{hr}\right] \times \text{amount of permeated water[L]}}{\pi \times \text{Membrane Inner Diameter}[m] \times \text{Effective Membrane Length}} \quad (5)$$

Note that a coefficient of water permeability P was calculated based on the relationship P [L/m²/hr/mm]=F/D from the membrane thickness D and the pure water permeability F, which were measured as described above.

[3] Compressive Strength (MPa)

One of the ends of wet hollow fiber membranes having a length of approximately 5 cm was sealed, and the other end was opened to the atmosphere. Pure water at a temperature of 40° C. was pressed from the outer surface, and permeated water was discharged from the end open to the atmosphere. At this time, the entire amount of the water which was fed to the membrane was filtered without being circulating, that is, an entire amount filtration method was adopted. The applied pressure was raised at intervals of 0.01 MPa from 0.1 MPa, the pressure was maintained at each pressure for 15 seconds, and the permeated water which was output from the end open to the atmosphere was sampled during the 15 second periods. While the hollow portion of the hollow fiber membranes did not collapse, the absolute value of the amount of permeated water (mass) also increased as the pressure increases, but when the pressure exceeded the compression resistance strength of the hollow fiber membranes, the hollow portion was crushed, and the blockage begins. Therefore, the absolute value of the amount of permeated water decreased despite the increased pressurizing pressure. The pressure at which the absolute value of the permeated water amount was maximal was designated as the compression resistance strength.

[4] The Mean Value (μm) of the Inner and Outer Surface Pore Diameters and the Coefficient of Variation (%) of the Outer Surface Pore Diameters The internal and external surface pore diameters of porous hollow fiber membranes were measured using a scanning electron microscope using photographs at magnifications capable of confirming the shapes of 100 or more pores.

The inner and outer surface pore diameters were obtained for each of the surfaces as follows. On each surface, the longest line segment among line segments that connect two points on the outer peripheries of the pores was designated as the long axis diameter. The longest line segment among line segments that connect the two points on the outer periphery of the pore so as to perpendicularly intersect the long axis diameter was designated as the short axis diameter. When an arbitrary line segment was drawn so as to cross the outer circumference of the pores, pores having three or more points at which the outer circumference thereof intersected with the line segment were excluded from targets of measurement. In addition, when observing the pores formed on the outer surface from the outer surface side to the inner surface side, there are cases where there are more pores toward the back of the pores. None of the pores existing toward the back of such pores correspond to the pores on the surface and were not targets of measurement. The inner surface pore diameters were measured in the same manner. Using the long axis and the short axis which were measured in this manner, the average values of (long axes) and (short axes) of 100 extracted pores were determined, and the arithmetic mean of the pore diameters of the 100 pores was determined for each surface, and designated as the average value of the pore diameters.

The outer surface/inner surface pore diameter ratio is the ratio of the average value of the pore diameters of the outer surface and the average value of the pore diameters of the inner surface, which are determined as described above.

The coefficient of variation of the pore diameters was calculated from 100 pieces of data obtained by measuring the pore diameters.

[5] Cross Sectional Pore Diameters (μm)

The cross sectional pore diameter is divided into 10 sections and normalized, and in the case that the side of the surface having small pore diameters is designated as 0, the pore diameters were measured for positions at 0.1, 0.1 to 0.2 . . . 0.9 to 1.0. A profile of the cross sectional pore diameters was analyzed to calculate the cross sectional pore diameter.

First, for example, an image photographed by a scanning electron microscope at a magnification that enables the shapes of 100 or more pores of the membrane divided into 10 sections to be confirmed was employed to discriminate the pore portions and the non pore portions according to the method disclosed in PCT/WO 01/53213 A1. In this method, a transparent sheet is superimposed on a copy of the electron microscopic image, the pore portions are filled black with a black pen or the like, and then the transparent sheet is copied onto a blank sheet. Thereby, the portions and the non pore portions can be clearly distinguished by the pore portions being black and the non pore portions being white. In cases that the perimeters of pores intersect a boundary line which is formed by dividing the cross section, such pores were not regarded as targets of measurement.

Commercially available image analysis software was employed to calculate the sum of the areas of the pore portions. The circle equivalent diameter of each pore was calculated, the equivalent circle diameters were arranged in descending order, and when the areas of the pores were added in order from the largest pore, the circle equivalent diameter when the sum corresponded to half of the total area of all of the pores was designated as the pore diameter of the cross section.

Among the calculated pore diameters at positions 0.6 to 0.7, 0.7 to 0.8, and 0.8 to 0.9, the maximum values of the pore diameters were designated to be the cross sectional pore diameters for positions 0.6 to 0.9 in the membrane thickness.

[6] Virus Blocking Performance

*Escherichia coli* phage MS-2 (Bacteriophage MS-2 NBRC 13965) (particle size about 25 nm) was employed as a test virus. The *Escherichia coli* phase MS-2 were grown to the order of $10^7$ pfu/ml in *Escherichia coli*, the pH was adjusted to 7 with 0.1 ml of a M phosphate buffer, and this was employed as a test stock solution. The virus blocking performance of the porous hollow fiber membrane was evaluated by the following nondestructive test.

Wet porous hollow fiber membranes were cut to an effective length of about 12 cm. The porous hollow fiber membranes were fixed in a tubular case such that one end of the porous hollow fiber membrane was sealed and the other end could be opened. A supply opening for liquid was provided in the case, 1000 ml of the phage solution was fed from the supply opening under a pressure of 20 kPa, and the phage solution was filtered from the outside to the inside of the porous hollow fiber membrane. Then, the filtrate was removed from the open end of the porous hollow fiber membrane, and 20 ml of the final flow was sampled. *Escherichia coli* phage MS2 were quantified in each of the test stock solution and the sampled filtrate, and the blocking performance (removal performance) of *Escherichia coli* phage MS2 was calculated from Formula (6) below.

$$\text{Removal Performance } (LRV) = -\log 10\left(1 - \frac{MS2 \text{ within raw water} - MS2 \text{ within filtered water}}{MS2 \text{ within raw water}}\right) \quad (6)$$

[7] Measurement of Water Content in Hydrophilic Polymer

Measurements were performed by an infrared moisture meter.

The following is a measurement method for a case in which a PVDF resin is used as a hydrophobic polymer component.

[8] Measurement of Polyethylene Glycol Content Relative to 100% by Weight of PVDF Resin in Porous Membrane (Residual Amount of PEG in Membrane)

Lambda 400 from JEOL Ltd. was employed as an NMR measuring device to conduct 1H-NMR measurement of the porous membranes, using d 6-DMF as a solvent and tetramethylsilane as an internal standard (0 ppm). The polyethylene glycol content was calculated according to the formula below, from the integral value (IPEG) of the signal derived from polyethylene glycol appearing in the vicinity of 3.6 ppm within an obtained spectrum, and the integral value (IPVDF) of the signal derived from the PVDF resin appearing in the vicinity of 2.9 to 3.2 ppm and 2.3 to 2.4 within the obtained spectrum.

Polyethylene glycol content (% by weight)={44 (IPEG/4)/60(IPVDF/2)}×100

[9] Polyethylene Glycol Weight Average Molecular Weight Measurement within Porous Membrane 0.1 g of the porous membrane was dissolved in 10 ml of acetone and the solution was dripped into 100 ml of water to cause the polymer constituting the membrane to reprecipitate. The polyethylene glycol remaining in the membrane was separated as an aqueous solution. Thereafter, the solution containing polyethylene glycol was concentrated by an evaporator, and then dissolved by the mobile phase solution below, to prepare a polyethylene glycol solution. 200 ml of the obtained solution was employed to conduct GPC measurement under the following conditions to determine the weight average molecular weight (in terms of polyethylene glycol standard sample).

Apparatus: HLC-8220 GPC (Tosoh Corporation)
Column: Shodex SB-803 HQ
Mobile phase: 0.7 ml/min $KH_2PO_4$ (0.02 mM)+$Na_2HPO_4$ (0.02 mM) aqueous solution
Detector: differential refractive index detector Next, the production method for each of the Examples and Comparative Examples will be described.

Example 1

As a PVDF resin, 25% by weight of a PVDF homopolymer (KYNAR 741 manufactured by Arkema) and 18% by weight of polyethylene glycol having a weight average molecular weight of 20000 (polyethylene glycol 20000 manufactured by Wako Pure Chemical Industries, Ltd.) were dissolved into 57% by weight of dimethylacetamide at 60° C., to prepare a membrane forming stock solution. The water content in the polyethylene glycol was 0.30% by weight.

This membrane forming stock solution was extruded from a double ring spinning nozzle (the double tubular nozzle 10 in the apparatus described above) together with an aqueous solution of 40% by weight of dimethylamide as a hollow forming agent. The mixture was solidified in water at a temperature of 78° C. after passing through a spatial running distance. Thereafter, the solidified solution was desolvated in water at a temperature of 60° C. to obtain a porous hollow fiber membrane. The amount of time that the membrane forming stock solution resided in water at 78° C. was 6.6 seconds. A heat moisture treatment was administered onto the resulting hollow fiber membrane at 60° C. The properties of the membranes, including those for the following examples, are summarized in Tables 1 and 2.

Example 2

A porous hollow fiber membrane was produced in the same manner as Example 1, except that 26% by weight of PVDF homopolymer (KYNAR 741, manufactured by Arkema Co.) as a PVDF resin and 16% by weight of polyethylene glycol having a weight average molecular weight of 35000 (polyethylene glycol 35000, manufactured by Merck Ltd.) were dissolved in 58% by weight of dimethylacetamide at 60° C. and employed as a membrane forming stock solution.

Example 3

A porous hollow fiber membrane was produced in the same manner as Example 1, except that 26% by weight of a PVDF homopolymer (KYNAR 741, manufactured by Arkema Co.) as a PVDF resin and 6% by weight of polyethylene glycol having a weight average molecular weight of 150000 (R-150 manufactured by Meisei Chemical Industry Co., Ltd.) were dissolved in 68% by weight of dimethylacetamide at 60° C. and employed as a membrane forming stock solution.

Example 4

18.7% by weight of a PVDF homopolymer (KYNAR 741, manufactured by Arkema) as a PVDF resin, 6.0% by weight of a PVDF homopolymer (KF 1700 manufactured by Kureha Corporation, KF 1700), and 16% by weight of polyethylene glycol having a weight average molecular weight of 35000 (polyethylene glycol 35000, manufactured by Merck) were dissolved in 59.3% by weight of N-methylpyrrolidone at 80° C. to prepare a membrane forming stock solution. The water content in the polyethylene glycol was 0.30% by weight.

This membrane forming stock solution was extruded from a double ring spinning nozzle together with an aqueous solution of N-methylpyrrolidone (40% by weight) as a hollow forming agent, solidified in water at 83° C. after passing through a spatial distance, and then desolvation was carried out in water at 60° C. to obtain a porous hollow fiber membrane. The amount of time that the membrane forming stock solution was present in water at 83° C. was 10.8 seconds. The porous hollow fiber membrane obtained in this manner was subjected to heat moisture treatment at 60° C.

Example 5

A porous hollow fiber membrane was produced in the same manner as Example 1, except that 19% by weight of a PVDF homopolymer (KYNAR 741, manufactured by Arkema Co.) as a PVDF resin, 7% by weight of a PVDF homopolymer (SOLEF 6020, manufactured by Solvay Corporation), and 16% by weight of a polyethylene glycol having a weight average molecular weight of 35,000 (polyethylene glycol 35000, manufactured by Merck) were dissolved in 58% by weight of dimethylacetamide at 60° C. and employed as a membrane forming stock solution.

Example 6

A porous hollow fiber membrane was produced in the same manner as Example 4, except that 18.7% by weight of a PVDF homopolymer (KYNAR 741, manufactured by Arkema) as a PVDF resin, 6.0% by weight of a PVDF homopolymer (SOLEF 6020, manufactured by Solvay, Inc.), and 16% by weight of polyethylene glycol having a weight average molecular weight of 35000 (polyethylene glycol 35000, manufactured by Merck) were dissolved in 59.3% by weight of N-methylpyrrolidone at 80° C. and employed as a membrane forming stock solution.

Figure 2:
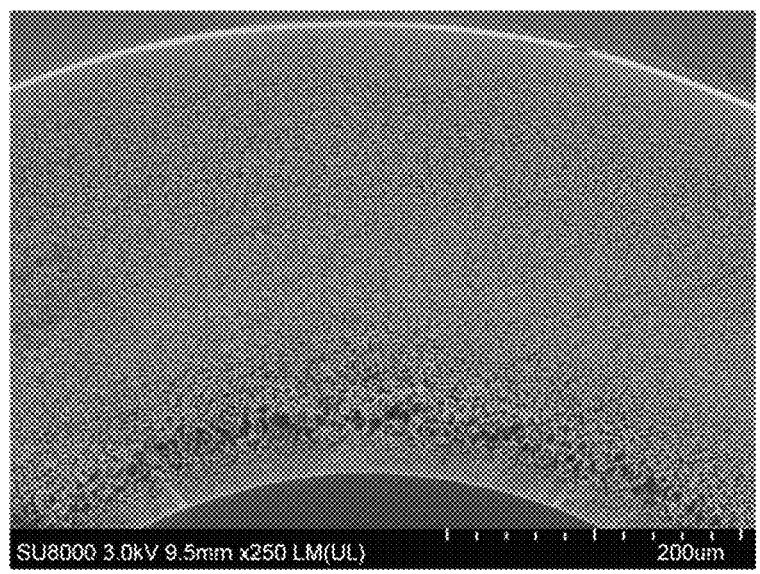
FIG. 2 is an electron micrograph (magnification: 250×) of a cross section of a porous membrane of Example 6.
Figure 3:
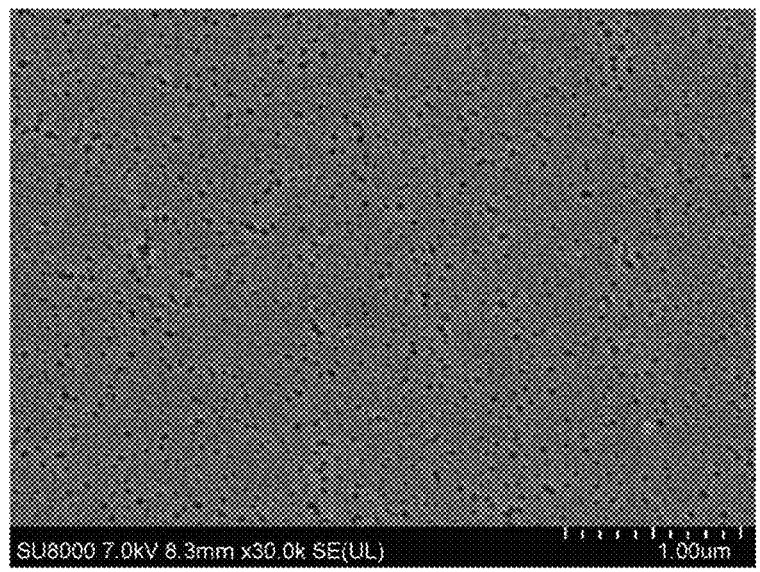
FIG. 3 is an electron micrograph (magnification: 30,000×) of the outer surface of the porous membrane of Example 6.

FIG. 2 is an electron micrograph (magnification: 250×) of a cross section of the porous membrane (porous hollow fiber membrane) of this Example, and FIG. 3 is an electron micrograph (magnification: 30,000×) of a first surface (outer surface of the porous hollow fiber membrane) this Example.

Example 7

25% by weight of a PVDF homopolymer (KYNAR 741, manufactured by Arkema Co.) as a PVDF resin and 17% by weight of polyethylene glycol having a weight average molecular weight of 35000 (manufactured by Merck & Co., polyethylene glycol 35000) were dissolved in 58% by weight of dimethylacetamide at 60° C. to prepare a stock solution for membrane formation. The water content in the polyethylene glycol was 0.3% by weight.

This membrane forming stock solution was extruded from a double ring spinning nozzle together with an aqueous solution of 80% by weight of dimethylamide as a hollow forming agent, allowed to solidify in water at 83° C. after passing through a spatial distance, then desolvated was carried out in water at 60° C., thereby obtaining a porous hollow fiber membrane. The amount of time that the membrane forming stock solution was present in the water at 83° C. was 21.2 seconds. The porous hollow fiber membrane obtained in this manner was subjected to heat moisture treatment at 60° C.

Example 8

24% by weight of a PVDF homopolymer (KYNAR 741, manufactured by Arkema Co., Ltd.) as a PVDF resin and 16% by weight of polyethylene glycol having a weight average molecular weight of 35000 (polyethylene glycol 35000, manufactured by Merck Ltd.) were dissolved in 60% by weight of N-methylpyrrolidone at 80° C. to prepare a membrane forming stock solution. The water content in the polyethylene glycol was 0.30% by weight.

This membrane forming stock solution was extruded from a double ring spinning nozzle together with an aqueous solution of N-methylpyrrolidone 80% by weight as a hollow forming agent, allowed to solidify in water at 83° C. after passing through a spatial distance, and then desolvation was carried out in water at 60° C. to obtain a membrane of a hollow fiber membrane. The amount of time that the membrane forming stock solution was present in water at 83° C. was 24.2 seconds. The resulting hollow fiber membrane was subjected to heat moisture treatment at 60° C.

Example 9

A porous hollow fiber membrane was produced in the same manner as in Example 6 except that the amount of time that the membrane forming stock solution was present in water at 83° C. was 14.3 seconds.

Example 10

A porous hollow fiber membrane was produced in the same manner as in Example 2 except that the hollow forming agent was changed to an aqueous solution containing 50% by weight of dimethylamide.

Example 11

A porous hollow fiber membrane was produced in the same manner as in Example 2 except that the hollow forming agent was changed to an aqueous solution containing 90% by weight of dimethylamide.

Example 12

A porous hollow fiber membrane was produced in the same manner as in Example 2 except that the membrane thickness was 0.2 mm.

Example 13

A porous hollow fiber membrane was produced in the same manner as in Example 2 except that the membrane thickness was 0.15 mm.

Example 14

A porous hollow fiber membrane was produced in the same manner as in Example 2 except that the amount of time that the membrane forming stock solution was present in water at 78° C. was 4.2 seconds. The cross section of the resulting porous hollow fiber membrane had poor communication properties and was a membrane having low water permeability.

Example 15

A porous hollow fiber membrane was produced in the same manner as in Example 2 except that the amount of time that the membrane forming stock solution was present in water at 78° C. was 2.2 seconds. The cross section of the resulting porous hollow fiber membrane had poor communication properties and was a membrane having low water permeability.

Example 16

A porous hollow fiber membrane was produced in the same manner as in Example 4 except that the amount of time that the membrane forming stock solution was present in water at 83° C. was 4.2 seconds. The cross section of the resulting porous hollow fiber membrane had poor communication properties and was a membrane having low water permeability.

Example 17

A porous hollow fiber membrane was prepared in the same manner as in Example 2 except that the hollow forming agent was changed to an aqueous solution containing 20% by weight of dimethylamide. The obtained porous hollow fiber membrane had a small pore diameter ratio between the outer surface and the inner surface and was a membrane with low water permeability.

Example 18

A porous hollow fiber membrane was prepared in the same manner as in Example 2 except that polyethylene glycol having a water content of 2.6% by weight was utilized.

Example 19

A porous hollow fiber membrane was produced in the same manner as in Example 1, except that 24% by weight of a PVDF homopolymer (KYNAR 741, manufactured by Arkema Co., Ltd.) as a PVDF resin and 18% by weight of polyethylene glycol having a weight average molecular weight of 35000 (manufactured by Merck & Co., polyethylene glycol 35000) were dissolved in 58% by weight of dimethylacetamide at 60° C. and employed as a membrane form stock solution.

Example 20

A porous hollow fiber membrane was produced in the same manner as in Example 2 except that the hollow forming agent was changed to an aqueous solution containing 30% by weight of dimethylamide.

Example 21

23% by weight of polyether sulfone (PES) (Ultrason E 6020 P, manufactured by BASF Co.) as a polysulfone-based resin and 20% by weight of polyvinylpyrrolidone (PVP) (Luvitec K30, manufactured by BASF) were dissolved in 47% by weight of N-methylpyrrolidone at 60° C. to prepare a membrane forming stock solution. Further, 10% by weight of glycerin (manufactured by Wako Pure Chemical Industries, Ltd.) was added to the solution and stirred. The water content in polyvinylpyrrolidone was 1.2% by weight.

This membrane forming stock solution was extruded from a double ring spinning nozzle together with an aqueous solution containing 60% by weight of N-methylpyrrolidone as a hollow forming agent and allowed to solidify in water at 83° C. after passing through a spatial distance, and then desolvation was carried out in water at 60° C., to obtain a porous hollow fiber membrane. The amount of time that the membrane forming stock solution was present in water at 83° C. was 6.6 seconds. The resulting hollow fiber membrane was subjected to heat moisture treatment at 60° C.

Comparative Example 1

A membrane forming stock solution was prepared in the same manner as in Example 3 except that the polyethylene glycol within the membrane forming stock solution was changed to that having a weight average molecular weight of 500000 (manufactured by Wako Pure Chemical Industries, Ltd., polyethylene glycol 500000). A uniform membrane forming stock solution could not be obtained, and a hollow fiber membrane could not be produced.

Comparative Example 2

A porous hollow fiber membrane was prepared in the same manner as in Example 2 except that polyethylene glycol having a water content of 3.9% by weight was utilized. The coefficient of variation of the outer surface of the resulting hollow fiber membrane increased, and the blocking rate with respect to viruses decreased.

Comparative Example 3

A porous hollow fiber membrane was prepared in the same manner as in Example 2 except that polyethylene glycol having a water content of 5.1% by weight was utilized. The coefficient of variation of the outer surface of the obtained porous hollow fiber membrane increased, and the blocking rate with respect to viruses decreased.

TABLE 1

| | | Example 1 | Example 2 | Example 3 | Example 4 | Example 5 | Example 6 | Example 7 |
|---|---|---|---|---|---|---|---|---|
| Hydrophobic Polymer | | PVDF | PVDF | PVDF | PVDF | PVDF | PVDF | PVDF |
| Common Solvent | | DMAc | DMAc | DMAc | NMP | DMAc | NMP | DMAc |
| Hydrophillic Polymer | | PEG | PEG | PEG | PEG | PEG | PEG | PEG |
| Non Solvent | | — | — | — | — | — | — | — |
| Weight Average Molecular Weight of Hydrophilic Polymer | MW | 20000 | 35000 | 150000 | 35000 | 35000 | 35000 | 35000 |
| Water Content of Hydrophillic Polymer | % | 0.30 | 0.30 | 0.30 | 0.30 | 0.30 | 0.30 | 0.30 |
| Solution Temperature (Td) | °C. | 60 | 60 | 60 | 80 | 60 | 80 | 60 |
| Hollow Forming Agent — Common Solvent | | DMAc | DMAc | DMAc | NMP | DMAc | NMP | DMAc |
| Hollow Forming Agent — Concentration | wt % | 40 | 40 | 40 | 40 | 40 | 40 | 80 |
| Spatial Running Section — Container | | Yes | Yes | Yes | Yes | Yes | Yes | Yes |
| Solution Temperature (Tb) | °C. | 78 | 78 | 78 | 83 | 78 | 83 | 83 |
| Time Present in Solution | sec | 6.6 | 6.6 | 6.6 | 10.8 | 6.6 | 10.8 | 21.2 |
| Hollow Fiber Membrane Outer Diameter | mm | 1.3 | 1.3 | 1.3 | 1.3 | 1.3 | 1.3 | 1.3 |
| Hollow Fiber Membrane Inner Diameter | mm | 0.70 | 0.70 | 0.70 | 0.70 | 0.70 | 0.70 | 0.70 |
| Membrane Thickness (D) | mm | 0.30 | 0.30 | 0.30 | 0.30 | 0.30 | 0.30 | 0.30 |
| Pure Water Permeability (F) | L/m$^2$/hr | 1892 | 2491 | 3400 | 2150 | 2103 | 2202 | 8815 |
| Coefficient of Water Permeability (P = F/D) | L/m$^2$/hr/mm | 6307 | 8303 | 11333 | 7167 | 7010 | 7340 | 29383 |
| MS2 Blocking Rate (Removal Performance) | LRV | 4.4 | 4.1 | 1.6 | 4.0 | 4.0 | 3.9 | 2.1 |
| Compressive Strength | Mpa | 0.60 | 0.50 | 0.51 | 0.56 | 0.55 | 0.55 | 0.58 |
| Average Outer Surface Pore Diameter | nm | 26 | 26 | 34 | 26 | 29 | 27 | 21 |
| Coefficient of Variation of Outer Surface Pore Diameters | % | 24 | 24 | 25 | 20 | 23 | 22 | 20 |
| Average Inner Surface Pore Diameter | μm | 0.13 | 0.18 | 0.22 | 0.16 | 0.15 | 0.15 | 12.4 |
| Outer/Inner Surface Pore Diameter Ratio | — | 5.0 | 7.0 | 6.5 | 6.2 | 5.3 | 5.5 | 579 |
| Cross Sectional Pore Diameters at Positions 0.6 to 0.9 in Membrane Thickness Cross Section | μm | 2.7 | 3.2 | 4.3 | 3.0 | 3.4 | 2.9 | 5.7 |
| PEG Content in Membrane (Residual Amount) | wt % | 1.4 | 2.3 | 2.9 | 2.2 | 2.1 | 2.5 | 3.1 |
| Weight Average Molecular Weight of PEG in Membrane | Mw | 25000 | 38000 | 250000 | 39000 | 40000 | 39000 | 41000 |

| | | Example 8 | Example 9 | Example 10 | Example 11 | Example 12 |
|---|---|---|---|---|---|---|
| Hydrophobic Polymer | | PVDF | PVDF | PVDF | PVDF | PVDF |
| Common Solvent | | NMP | NMP | DMAc | DMAc | DMAc |
| Hydrophillic Polymer | | PEG | PEG | PEG | PEG | PEG |
| Non Solvent | | — | — | — | — | — |
| Weight Average Molecular Weight of Hydrophilic Polymer | MW | 35000 | 35000 | 35000 | 35000 | 35000 |
| Water Content of Hydrophillic Polymer | % | 0.30 | 0.30 | 0.30 | 0.30 | 0.30 |
| Solution Temperature (Td) | °C. | 80 | 80 | 60 | 60 | 60 |
| Hollow Forming Agent — Common Solvent | | NMP | NMP | DMAc | DMAc | DMAc |
| Hollow Forming Agent — Concentration | wt % | 80 | 40 | 50 | 95 | 40 |
| Spatial Running Section — Container | | Yes | Yes | Yes | Yes | Yes |
| Solution Temperature (Tb) | °C. | 83 | 83 | 78 | 78 | 78 |
| Time Present in Solution | sec | 24.2 | 14.3 | 6.6 | 6.6 | 6.6 |
| Hollow Fiber Membrane Outer Diameter | mm | 1.3 | 1.3 | 1.3 | 1.3 | 1.1 |
| Hollow Fiber Membrane Inner Diameter | mm | 0.70 | 0.70 | 0.70 | 0.70 | 0.70 |
| Membrane Thickness (D) | mm | 0.30 | 0.30 | 0.30 | 0.30 | 0.20 |
| Pure Water Permeability (F) | L/m$^2$/hr | 8632 | 2521 | 2745 | 9523 | 2612 |
| Coefficient of Water Permeability (P = F/D) | L/m$^2$/hr/mm | 28773 | 8403 | 9150 | 31743 | 13060 |
| MS2 Blocking Rate (Removal Performance) | LRV | 2.0 | 4.1 | 4.1 | 22 | 4.0 |
| Compressive Strength | Mpa | 0.56 | 0.56 | 0.46 | 0.41 | 0.41 |
| Average Outer Surface Pore Diameter | nm | 23 | 24 | 31 | 30 | 25 |
| Coefficient of Variation of Outer Surface Pore Diameters | % | 20 | 29 | 31 | 33 | 23 |
| Average Inner Surface Pore Diameter | μm | 11.4 | 0.20 | 0.17 | 13.4 | 0.19 |
| Outer/Inner Surface Pore Diameter Ratio | — | 487 | 8.3 | 5.6 | 453 | 7.6 |
| Cross Sectional Pore Diameters at Positions 0.6 to 0.9 in Membrane Thickness Cross Section | μm | 5.4 | 3.8 | 3.4 | 7.2 | 2.9 |
| PEG Content in Membrane (Residual Amount) | wt % | 1.6 | 2.2 | 2.6 | 1.7 | 3.1 |
| Weight Average Molecular Weight of PEG in Membrane | Mw | 38000 | 41000 | 41000 | 42000 | 39000 |

TABLE 2

|  |  | Example 13 | Example 14 | Example 15 | Example 16 | Example 17 | Example 18 |
|---|---|---|---|---|---|---|---|
| Hydrophobic Polymer |  | PVDF | PVDF | PVDF | PVDF | PVDF | PVDF |
| Common Solvent |  | DMAc | DMAc | DMAc | NMP | DMAc | DMAc |
| Hydrophillic Polymer |  | PEG | PEG | PEG | PEG | PEG | PEG |
| Non Solvent |  | — | — | — | — | — | — |
| Weight Average Molecular Weight of Hydrophillic Polymer | MW | 35000 | 35000 | 35000 | 35000 | 35000 | 35000 |
| Water Content of Hydrophillic Polymer | % | 0.30 | 0.30 | 0.30 | 0.30 | 0.30 | 2.6 |
| Solution Temperature (Td) | °C. | 60 | 60 | 60 | 80 | 60 | 60 |
| Hollow Forming Agent  Common Solvent | | DMAc | DMAc | DMAc | NMP | DMAc | DMAc |
| Hollow Forming Agent  Concentration | wt % | 40 | 40 | 40 | 40 | 20 | 40 |
| Spatial Container Running Section |  | Yes | Yes | Yes | Yes | Yes | Yes |
| Solution Temperature (Tb) | °C. | 78 | 78 | 78 | 83 | 78 | 78 |
| Time Present in Solution | sec | 6.6 | 4.2 | 2.2 | 4.2 | 6.6 | 6.6 |
| Hollow Fiber Membrane Outer Diameter | mm | 1.0 | 1.3 | 1.3 | 1.3 | 1.3 | 1.3 |
| Hollow Fiber Membrane Inner Diameter | mm | 0.70 | 0.70 | 0.70 | 0.70 | 0.70 | 0.70 |
| Membrane Thickness (D) | mm | 0.15 | 0.30 | 0.30 | 0.30 | 0.30 | 0.30 |
| Pure Water Permeability (F) | L/m$^2$/hr | 3430 | 1491 | 834 | 1414 | 1543 | 2732 |
| Coefficient of Water Permeability (P = F/D) | L/m$^2$/hr/mm | 22867 | 4970 | 2780 | 4713 | 5143 | 9107 |
| MS2 Blocking Rate (Removal Performance) | LRV | 3.9 | 3.6 | 3.7 | 4.1 | 4.6 | 2.6 |
| Compressive Strength | Mpa | 0.28 | 0.55 | 0.51 | 0.56 | 0.61 | 0.50 |
| Average Outer Surface Pore Diameter | nm | 26 | 21 | 25 | 24 | 29 | 26 |
| Coefficient of Variation of Outer Surface Pore Diameters | % | 31 | 22 | 33 | 29 | 27 | 45 |
| Average Inner Surface Pore Diameter | μm | 0.21 | 0.14 | 0.13 | 0.20 | 0.082 | 0.182 |
| Outer/Inner Surface Pore Diameter Ratio | — | 8.0 | 6.7 | 5.1 | 8.3 | 2.8 | 7.0 |
| Cross Sectional Pore Diameters at Positions 0.6 to 0.9 in Membrane Thickness Cross Section | μm | 3.1 | 1.7 | 1.2 | 1.6 | 1.8 | 3.1 |
| PEG Content in Membrane (Residual Amount) | wt % | 2.3 | 2.1 | 1.8 | 2.1 | 2.2 | 2.4 |
| Weight Average Molecular Weight of PEG in Membrane | Mw | 41000 | 41000 | 40000 | 42000 | 41000 | 42000 |

|  |  | Example 19 | Example 20 | Example 21 | Comparative Example 1 | Comparative Example 2 | Comparative Example 3 |
|---|---|---|---|---|---|---|---|
| Hydrophobic Polymer |  | PVDF | PVDF | PES | PVDF | PVDF | PVDF |
| Common Solvent |  | DMAc | DMAc | NMP | DMAc | DMAc | DMAc |
| Hydrophillic Polymer |  | PEG | PEG | PVP | PEG | PEG | PEG |
| Non Solvent |  | — | — | Glycerin | — | — | — |
| Weight Average Molecular Weight of Hydrophillic Polymer | MW | 35000 | 35000 | 45000 | 500000 | 35000 | 35000 |
| Water Content of Hydrophillic Polymer | % | 0.30 | 0.30 | 1.20 | 0.30 | 3.9 | 5.1 |
| Solution Temperature (Td) | °C. | 60 | 60 | 70 |  | 60 | 60 |
| Hollow Forming Agent  Common Solvent | | DMAc | DMAc | NMP |  | DMAc | DMAc |
| Hollow Forming Agent  Concentration | wt % | 40 | 30 | 60 |  | 40 | 40 |
| Spatial Container Running Section |  | Yes | Yes | Yes |  | Yes | Yes |
| Solution Temperature (Tb) | °C. | 78 | 78 | 83 |  | 78 | 78 |
| Time Present in Solution | sec | 6.6 | 6.6 | 6.6 |  | 6.6 | 6.6 |
| Hollow Fiber Membrane Outer Diameter | mm | 1.3 | 1.3 | 1.3 |  | 1.3 | 1.3 |
| Hollow Fiber Membrane Inner Diameter | mm | 0.70 | 0.70 | 0.70 |  | 0.70 | 0.70 |
| Membrane Thickness (D) | mm | 0.30 | 0.30 | 0.30 |  | 0.30 | 0.30 |
| Pure Water Permeability (F) | L/m$^2$/hr | 3712 | 1923 | 2844 |  | 2583 | 2512 |
| Coefficient of Water Permeability (P = F/D) | L/m$^2$/hr/mm | 12373 | 6410 | 9480 |  | 8610 | 8373 |
| MS2 Blocking Rate (Removal Performance) | LRV | 2.1 | 4.5 | 2.0 |  | 1.3 | 1.0 |
| Compressive Strength | Mpa | 0.42 | 0.58 | 0.50 |  | 0.50 | 0.50 |
| Average Outer Surface Pore Diameter | nm | 52 | 26 | 36 |  | 26 | 27 |
| Coefficient of Variation of Outer Surface Pore Diameters | % | 37 | 24 | 32 |  | 54 | 61 |
| Average Inner Surface Pore Diameter | μm | 0.192 | 0.123 | 0.22 |  | 0.18 | 0.20 |
| Outer/Inner Surface Pore Diameter Ratio | — | 3.7 | 4.7 | 6.1 |  | 7.0 | 7.3 |
| Cross Sectional Pore Diameters at Positions 0.6 to 0.9 in Membrane Thickness Cross Section | μm | 3.0 | 23 | 5.3 |  | 3.2 | 3.1 |
| PEG Content in Membrane (Residual Amount) | wt % | 3.5 | 2.2 | — |  | 2.4 | 2.5 |
| Weight Average Molecular Weight of PEG in Membrane | Mw | 41000 | 39000 | — |  | 41000 | 39000 |

What is claimed:

1. A porous membrane having a thickness of 150 μm or greater, and in which the average value of pore diameters of a first surface is smaller than the average value of pore diameters of a second surface, characterized by:

the average value of the pore diameter of the first surface being 60 nm or less; and the coefficient of variation of the pore diameters being 10% or greater and 45% or less, wherein the porous membrane has a three dimensional mesh structure, and wherein the porous membrane has a coefficient of water permeability P (=F/D) expressed by the ratio of pure water permeability F to a membrane thickness D that is 5200 [L/m²/hr/mm] or greater;

wherein the porous membrane is constitute by a single layer; and has a compressive strength of 0.40 MPa or greater.

2. A porous membrane as defined in claim 1, wherein:
pores having pore diameters of 2.0 μm or greater are present at positions within a range from 0.6 to 0.9 in the direction of membrane thickness, in a membrane thickness normalized with the first surface designated as 0 and the second surface designated as 1.

3. A porous membrane as defined in claim 1, wherein:
the average value of the pore diameters of the second surface is three times or greater than the average value of the pore diameters of the first surface.

4. A porous membrane as defined in claim 1, wherein:
the porous membrane includes a vinylidene fluoride resin as a main component.

5. A porous membrane as defined in claim 1, wherein:
the porous membrane is formed by a vinylidene fluoride resin and a resin that includes polyethylene glycol having a weight average molecular weight of 20,000 or greater and 300,000 or less; and
the polyethylene glycol is included at an amount of 0.01 parts by weight or greater and 4.0 parts by weight or less with respect to 100 parts by weight of the vinylidene fluoride resin.

6. A porous membrane as defined in claim 1, wherein:
the porous membrane includes a pulysulfone resin as a main component.

7. A porous membrane as defined in claim 1, wherein:
the average value of the pore diameters of the first surface is 5 nm or greater.

8. A porous membrane as defined in claim 1, wherein:
the membrane thickness of the porous membrane is 200 μm or greater.

9. A method for producing the porous membrane according to claim 1, comprising:
extruding a membrane forming stock solution that includes at least a hydrophobic polymer component, a hydrophilic polymer component, and a common solvent of the hydrophobic polymer component and the hydrophilic polymer component from a forming nozzle; and
causing the membrane forming stock solution to solidify in a solution having water as a main component;
the percentage of moisture in the hydrophilic polymer being 3.0% or less,
wherein the amount of time that the membrane forming stock solution is present within the solution in the solidifying the membrane forming stock solution in a solution is 5.0 seconds or greater.

10. A method for producing a porous membrane as defined in claim 9, wherein:
the porous membrane is formed into a hollow fiber shape; and
for the solvent, which is used as a common solvent for the membrane forming stock solution, mixed with water at a weight ratio within a range from 25 to 95, to be employed as a hollow forming agent.

11. A method for producing a porous membrane as defined in claim 9, wherein:
the hydrophobic polymer component is a vinylidene fluoride resin.

12. A method for producing a porous membrane as defined in claim 9, wherein:
the hydrophilic polymer component is polyethylene glycol having a weight average molecular weight of 20,000 or greater and 150,000 or less.

13. A method for producing a porous membrane as defined in claim 9, wherein:
the hydrophobic polymer component is a polysulfone resin.

* * * * *